Dec. 30, 1941.   A. C. LUSHER ET AL   2,268,142
COUPLING WITH COLLAPSIBLE NIPPLE FLANGE
Filed Sept. 27, 1939

Inventors
Albert C. Lusher
and Albert J. Scholtes
By Mawhinney & Mawhinney
Attorneys.

Patented Dec. 30, 1941

2,268,142

UNITED STATES PATENT OFFICE 2,268,142

COUPLING WITH COLLAPSIBLE NIPPLE FLANGE

Albert C. Lusher, Waterbury, Conn., and Albert J. Scholtes, Baltimore, Md., assignors to Scovill Manufacturing Company, Waterbury, Conn., a corporation of Connecticut Application September 27, 1939, Serial No. 296,858

13 Claims. (Cl. 285—84)

The present invention relates to hose couplings, and more particularly to the type having internally expanding nipples.

An object of the invention is to provide an expansible nipple which is insertable in a coupling body and which, after expansion and use, may be removed from the coupling body so that the latter may be repeatedly used with new or replacement nipples.

Another object of the invention is to provide a nipple of the expansible type with an annular exterior flange capable of being deformed during expansion to grip and effect the seating of the nipple and the sealing of the hose in the body of the coupling.

A further object of the invention is to provide a coupling body and a separate cooperating expansible nipple slidably fitting in the body and having a flange, or other exterior projecting portion, which, when the nipple is expanded and slid into the coupling body, is deformed in such a manner as to not only grip the hose end but to increase the effectiveness of the seal incident to the securing of the coupling on the hose.

A still further object of the invention is to provide a coupling body and expansible, slidable nipple with a deformable exterior flange which may be used with a cooperating separate sealing washer compressible and deformable upon the expansion and sliding of the nipple and the deformation of the flange to insure the sealing of the outer portion of the nipple, and which compresses and deforms the hose end to seal the inner end of the nipple in the coupling.

Another object of the invention is to provide a nipple which is adapted for sliding engagement in the body portion of a hose coupling, and which is expansible and provided with an exterior flange which is deformable upon the sliding and expansion of the nipple when located in the coupling body.

The invention also provides a coupling body with a slidable, expansible nipple therein having the deformable flange, and provides the coupling body with a locking notch into which a part of the flange engages when deformed by the expanding and sliding movement so as to secure the nipple against axial stresses when the coupling is secured upon the hose.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a central longitudinal section taken through a hose coupling body with a nipple fitted therein ready to receive the end of a hose, and showing the features of the present invention.

Figure 1:
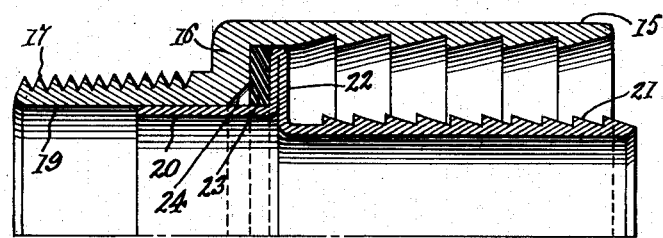
Figure 2:
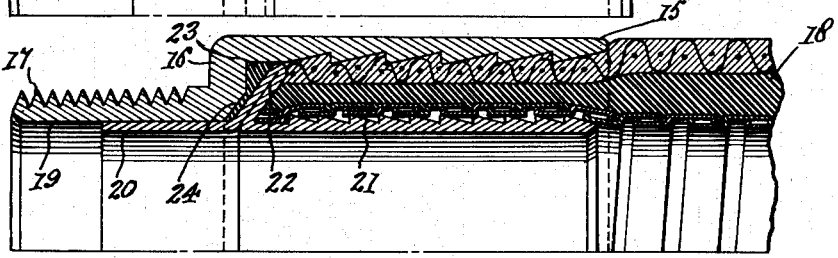
Figure 2 is a similar view of the same with the coupling secured on the end of a hose.

Referring now the drawing, and first to Figures 1 and 2, 15 designates the inner portion or sleeve of the coupling body which is reduced or offset inwardly at its inner end to provide an abutment wall 16 and a connecting portion 17.

The sleeve 15 may have internal buttress type threads as shown to admit the relatively easy insertion of the end 18 of a hose into the inner end of the sleeve and to offer a high resistance to pulling out of the hose, particularly after the coupling is secured on the hose.

The inner wall of the connecting portion 17 is provided with a bore 19 substantially equal to the outer diameter of the portion 20 of the nipple, so that the nipple may be driven out by a suitable instrument, inserted in the bore 19 to reclaim a portion of the coupling, such as the sleeve or body portion 15 for reuse. Slidably fitting in this bore 19 is the outer end 20 of a nipple 21. The nipple 21 is of the expansible type and may have buttress type threads or grooves on its exterior surface to engage in the inner wall of the hose 18 when the nipple is expanded. The body portion of the nipple 21 is of less diameter than that of the outer end 20 of the nipple to provide an enlarged annular space between the nipple 21 and the sleeve 15 for the endwise reception of the hose end 18. The outer end 20 of the nipple has an external diameter substantially equal to that of the bore 19 of the connecting portion 17 of the coupling body to provide for the free flow of liquid therethrough. The internal diameter of the outer end 20 of the nipple is substantially equal to the internal diameter of the hose 18, so as to provide through the coupling a flow diameter equal to that of the hose 18.

Preferably at or adjacent to the juncture between the body portion of the nipple 21 and its outer end 20, the nipple carries an exterior flange 22 which, before expansion of the nipple, is adapted for positioning adjacent the abutment wall 16 of the coupling body and which extends radially toward the inner wall of the sleeve 15. This flange 22 may be provided in any suitable manner, and in the present instance comprises an outwardly directed bead or crimp formed at the outer end of the nipple body 21, the inner wall of the crimp being of greater width than the outer wall thereof to provide for the difference in diameters of the body and end portions, 21 and 20, respectively, of the nipple.

The difference in the diameters of the body and end portion, 21 and 20, respectively, of the nipple and the disposition of the flange 22 at this point of juncture between the body and end portion of the nipple provides a couple of opposed forces which are axially offset when the nipple is expanded and advanced outwardly in the coupling with the result that the pressure disposed against the outer side of the flange 22 is outwardly of the zone of pressure against the lower end of the flange 22 where it merges into the forward end of the nipple 21. The result of these opposed and axial offset forces is that the flange 22 will be swung backwardly and downwardly into clinching relation upon the adjacent end of the hose 18 and will thus grip or pinch the hose and hold it firmly about the nipple 21. Of course during this bending or swinging action of the flange 22 the nipple 21 is expanded so that it finally has an internal diameter equal substantially to that of the outer end portion 20 of the nipple, and this expansion provides an opposed jaw surface which assists in the clinching or binding of the hose end between the flange 22 and the nipple 21.

If desired a compressible or deformable washer 23 may be interposed between the abutment wall 16 of the coupling body and the flange 22 of the nipple as shown in Figure 1. The nipple end 20 is proportioned in length to leave a space or clearance between the extremity of the nipple end 20 and the outer end of the bore 19 of the coupling body so that during expansion of the nipple 21 the progressive expansion action may slide the nipple with its flange 22 outwardly to deform the flange 22 in accordance with the resistance offered by the offset portion of the flange and the pressure of the washer and the configuration of the inner face of the abutment wall 16.

The open end of the sleeve 15 may be slightly flared or rounded as shown in Figure 1 to facilitate introduction of the hose end into the coupling and for protecting the outer surface portion of the hose against cutting and damage after the coupling is secured in place.

In securing the coupling on the end of a hose a suitable expander tool is inserted in the hose end 18 with the expander head innermost. The nipple 21 is then inserted in the hose end with the nipple flange 22 bearing against the extremity of the hose end. The coupling sleeve 15, with or without the washer 23, is then fitted over the hose end 18 until limited by the nipple flange 22. The sliding end of the nipple extends into the bore 19 in the coupling extension 17 and retains the sleeve and nipple in desired concentric relation.

As the expander tool is progressively drawn out of the hose 18 into the nipple 21, the latter is expanded and advanced in the coupling body to compress the hose 18 between the nipple 21 and the sleeve 15 and to urge the hose inwardly toward the abutment wall 16. The hose end is therefore compressed against the nipple flange 22 and the latter is forced against the washer 23, when used. The washer 23 is compressed and deformed against the face of the abutment wall and offers a counter resistance against the unsupported outer edge portion of the flange 22, plus the swinging action of the offset portion of the flange 22 on its connections with the parts 20 and 21 of the nipple with the result that the flange is deformed and bent inwardly toward the portion 21 of the nipple and grips and compresses the extremity of the hose in the bight or angle between the deformed flange 22 and the adjacent portion of the expanded and advanced part 21 of the nipple. The abutment wall may have a flat inner face with an annular beveled portion 24 at its inner marginal edge providing an annular recess about the nipple end 20 into which a portion of the washer 23 is compressed and which assists in the bending action of the flange 22 when deformed. This expanded condition is shown in Figure 2. Here the washer seals the outer end of the nipple in the coupling while the pinched and gripped hose end seals the inner end of the nipple in the hose. Where the washer is omitted, as in Figures 3 to 6, it is apparent that the nipple flange will be deformed by direct engagement with the face 24a or 24b, of the abutment wall 16a or 16b and will effect a seal thereagainst as well as the gripping action on the hose end.

Figure 3:
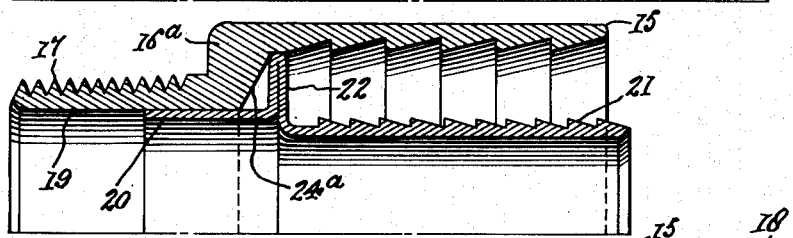
Figure 3 is a view similar to Figure 1 showing a slight modification in the end shoulder of the coupling body, the washer being omitted.
Figure 4:
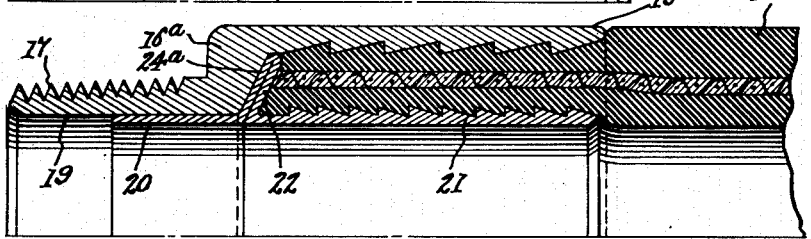
Figure 4 is a like view showing the nipple expanded and the hose secured in the coupling.

In the modification shown in Figures 3 and 4, the abutment wall 16a has a beveled portion 24a at its outer margin so that the nipple flange 22 may lie flat thereagainst when deformed, as shown in Figure 4.

Figure 5:
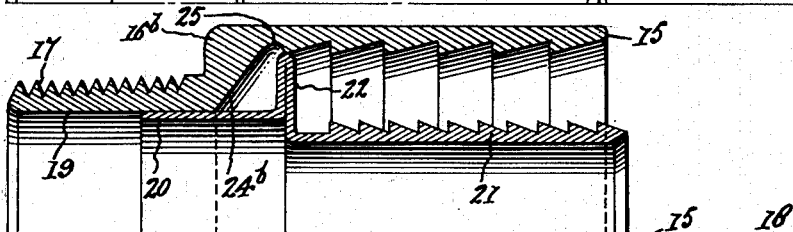
Figure 5 is a view similar to Figure 1 but showing another modified form wherein the coupling body has an interlocking notch.
Figure 6:
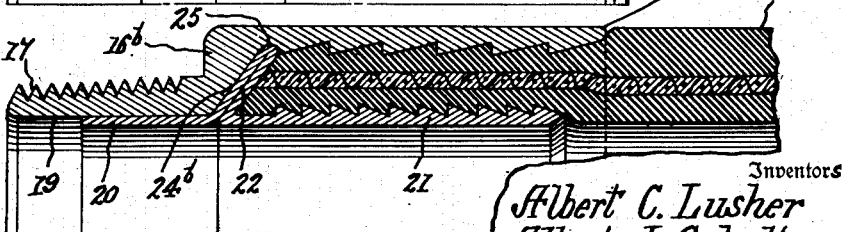
Figure 6 is a view of the same with the nipple expanded and the flange thereof interlocked with the coupling body and with a hose secured in the coupling.

In Figures 5 and 6, the abutment wall 16b has a continuous beveled face 24b terminating at its outer margin in a notch or cavity 25 in the inner wall of the sleeve 15. As shown in Figure 6, the outer edge portion of the nipple flange 22, when deformed by the sliding and bending action of the same, by the progressive expansion of the nipple 21, is forced radially into the notch 25 and holds the nipple from axial stresses in the coupling body, except by force of a removal tool which may be inserted against the nipple end 20 and within the bore 19, for driving the nipple out.

This type of nipple with its gripping and sealing advantages, after use, may be extracted and removed from the coupling body without injury thereto and new nipples 21 may be used in the coupling body so that the latter may be repeatedly used over a long period of time.

It is obvious that various changes and modifications may be made in the details of construction and design of the above specifically described embodiment of this invention without departing from the spirit thereof, such changes and modifications being restricted only by the scope of the following claims.

What is claimed is:

1. A hose coupling comprising a coupling body having a sleeve for engagement over the end of a hose and having an abutment wall at its outer end to aline with the extremity of the hose, and an expansible nipple slidably disposed in the coupling body for engagement at one end in the end of the hose and having an exterior annular flange at its outer end disposed in the sleeve adjacent said abutment wall for receiving the extremity of the hose thereagainst, said nipple during expansion adapted to slide outwardly and carry said flange toward the abutment wall and to axially compress the hose end against the flange whereby the reaction from said abutment wall is adapted to force the flange against the extremity of the hose.

2. A hose coupling comprising a coupling body having a sleeve for engagement over the end of a hose and having an abutment wall at its outer end to aline with the extremity of the hose, and an expansible nipple slidably mounted in the coupling body for engagement in the bore of the hose and having an exterior deformable flange thereabout adapted to engage the extremity of the hose, said abutment wall having an inwardly flaring face, said nipple during expansion adapted to slide outwardly and axially and radially compress the hose to cause the hose to move against said deformable flange and force the flange against said flaring face of the abutment wall, whereby said flange is deformed substantially to the configuration of the flaring face and caused to bite into and grip and seal the extremity of the hose in the coupling.

3. A hose coupling, comprising a coupling body having a sleeve for engagement over the end of a hose and having an abutment wall at its outer end to aline with the extremity of the hose, a compressible and deformable washer seated against the face of said abutment wall, said abutment wall face having a generally inwardly flaring contour, and an expansible and slidable nipple disposed in the coupling body for engagement in the bore of the hose and provided with an annular exterior deformable flange for positioning between the abutment wall face and the end of the hose, said nipple during expansion adapted to slide and impinge and deform the flange against said washer and force the deformed flange into the extremity of the hose to grip and seal the same upon the nipple.

4. A hose coupling comprising a coupling body having a sleeve for engagement over the end of a hose and having an abutment wall at its outer end to aline with the extremity of the hose, a compressible washer seated against said abutment wall, and an expansible nipple slidably mounted in the coupling body to engage in the bore of the hose and having an annular exterior flange for positioning against said washer, said nipple during expansion adapted to slide outwardly and axially compress the hose end against said flange and force the latter against the washer to seal the hose on the nipple and seal the inner end of the nipple in the coupling body.

5. A hose coupling comprising a coupling body to extend about the end of a hose, an expansible nipple slidably mounted in said coupling body and having an exterior deformable annular flange initially positioned substantially perpendicular to the coupling axis adapted to be deformed so as to grip against the annular end of the hose in the coupling body, said coupling body having a part against which said flange is adapted to react in the outward sliding movement of the nipple in the coupling body to cause said flange to be so deformed in relation to the hose end.

6. In a hose coupling, the combination of a coupling body having an abutment wall at one end and a reduced extension from the abutment wall provided with a recess opening through the inner marginal portion of the wall, and an expansible nipple disposed in the coupling body having a slidable extension at its inner end for engagement in the recess in the coupling body and provided with an outwardly crimped flange at the juncture between the inner end of the extension and the body portion of the nipple, said nipple adapted for expansion and sliding movement in the coupling body to impinge said flange against the abutment wall for deforming the flange to the shape of the inner face of the wall and secure a hose end in the coupling and for gripping the deformed flange upon the extremity of the hose end.

7. A hose coupling comprising a coupling body having an abutment wall at one end with an inner face having a beveled portion thereon, a nipple slidably mounted in the coupling body and provided with an annular deformable flange disposed adjacent the abutment wall, said nipple being expansible and adapted for insertion in the bore of the hose and said flange adapted to receive the end of the hose thereagainst, said nipple during expansion adapted to slide outwardly of the coupling body and compress the hose endwise against the flange and impinge the latter against the face of the abutment wall for deforming the flange to the contour of the wall face and for pinching the flange on the end of the hose.

8. A hose coupling comprising a coupling body having an abutment wall at its outer end provided with a beveled inner face terminating in a notch at the outer marginal edge of the face, and a nipple adapted for insertion in the bore of a hose and being expansible and slidably engaged in the coupling body, said nipple having an annular exterior deformable flange for engagement with the abutment wall and the end of the hose, said nipple adapted to be expanded and slid outwardly of the coupling body to axially compress the hose against the flange and to impinge the latter against said beveled face of the abutment wall and force the outer edge portion of the flange into said notch for interlocking the nipple in the coupling body.

9. A hose coupling comprising a coupling body having a sleeve for engagement over the end of a hose and provided with an abutment wall at its inner end to receive the extremity of the hose thereagainst, said abutment wall having a generally outwardly flaring contour, and an expansible and slidable nipple disposed in the coupling body for engagement in the bore of the hose and provided with an annular exterior deformable flange for positioning between the abutment wall face and the end of the hose, said nipple during expansion adapted to slide and impinge and deform the flange against said abutment wall face and overturn the deformed flange upon the extremity of the hose to grip and seal the same upon the nipple.

10. In combination with the coupling body of a hose coupling, a nipple having a forward end slidable in the coupling body and provided with an expansible body portion within the coupling body, said nipple having an annular flange thereabout at the juncture of said portions of the nipple adapted to be swung backwardly and downwardly in the end of a hose in the coupling to pinch the latter against the nipple during the expansion of the latter, said coupling body having means therein disposed in the path of said flange during outward movement of said nipple adapted to encounter said flange and arrest its movement during the further outward movement of said nipple.

11. In combination with the coupling body of a hose coupling, a nipple having a forward end slidably mounted in the coupling body and provided with a body portion of less diameter than said forward end and having at the juncture of the body portion and the forward end an exterior annular flange, said nipple adapted for insertion in the end of a hose disposed in the coupling body and said flanged upon the expansion and forward sliding movement of the body portion of the nipple adapted to swing down and clinch upon the extremity of the hose in the coupling incident to the axially offset opposed forces exerted by the forward end and body portion of the nipple.

12. In a hose coupling, a coupling body having an enlarged sleeve at its inner end providing an intermediate abutment shoulder against which the end of a hose in the sleeve is adapted to engage, a nipple having a slidable forward end for insertion in the coupling body and provided with a reduced body portion for engagement in the sleeve and to engage in the bore of a hose, said nipple provided with a deformable outstanding flange at the juncture between the body portion and the forward end of the nipple, said flange adapted to engage the extremity of the hose, said body portion of the nipple adapted to be expanded and the nipple during expansion adapted to move forwardly in the coupling body to deform the flange and pinch the latter upon the extremity of the hose, the end of said forward portion of the nipple provided with an abutment end adapted to receive a punch introduced through the outer end of the body portion for dislodging the nipple from the body portion, whereby the latter may be reused.

13. A has coupling comprising a coupling body adapted to fit about the end of a hose and having an abutment wall with an abutment face composed of two planes, the outer plane being substantially perpendicular to the coupling axis, the inner plane being inclined to said axis, a compressible and deformable washer seated against said abutment wall face, and an expansible and slidable nipple disposed in the coupling body and engageable in the bore of the hose, said nipple having an external deformable flange positioned relatively between the abutment wall face and end portion of the hose, said nipple during expansion being slidable relatively in said coupling body to cause said deformable flange to ride against and compress said washer against said abutment wall face and to cause the inner portion of said washer to be deformed against the inclined part of the abutment wall face resulting in the reaction upon said flange to cause the flange to be bent back upon the end portion of the hose to grip and seal the hose upon the nipple.

ALBERT C. LUSHER.
ALBERT J. SCHOLTES.